(12) United States Patent
Tomlinson et al.

(10) Patent No.: US 7,621,133 B2
(45) Date of Patent: Nov. 24, 2009

(54) METHODS AND APPARATUS FOR STARTING UP COMBINED CYCLE POWER SYSTEMS

(75) Inventors: Leroy Omar Tomlinson, San Diego, CA (US); Charles Michael Jones, Ballston Lake, NY (US); Gordon Raymond Smith, Ballston Spa, NY (US); Mark Joseph Steffen, Louisville, KY (US); Bruce Charles Martindale, Charlton, NY (US); Marc Trent Kazanas, Alpharetta, GA (US); Paul Ronan Murphy, Duanesburg, NY (US); Gurbaksh Singh Ohson, Syosset, NY (US); Steven David Shemo, Niskayuna, NY (US); Eric YuHang Fung, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 586 days.

(21) Appl. No.: 11/282,215

(22) Filed: Nov. 18, 2005

(65) Prior Publication Data

US 2007/0113562 A1 May 24, 2007

(51) Int. Cl.
*F02C 6/18* (2006.01)
*F02C 7/26* (2006.01)

(52) U.S. Cl. .................... 60/778; 60/39.182; 60/786
(58) Field of Classification Search .............. 60/39.182, 60/772, 778, 786; 122/7 R, 7 B
See application file for complete search history.

(56) References Cited

U.S. PATENT DOCUMENTS

| 4,208,882 | A  | * | 6/1980  | Lopes et al. | ......... | 60/653 |
| 4,391,101 | A  | * | 7/1983  | Labbe et al. | ......... | 60/646 |
| 6,042,246 | A  |   | 3/2000  | Waldmann     |           |        |
| 6,499,302 | B1 | * | 12/2002 | Ranasinghe   | ......... | 60/772 |
| 6,766,646 | B1 |   | 7/2004  | Ford et al.  |           |        |

* cited by examiner

*Primary Examiner*—Louis J Casaregola
(74) *Attorney, Agent, or Firm*—Armstrong Teasdale LLP

(57) ABSTRACT

Methods and apparatus for fast starting and loading a combined cycle power system are described. In one example embodiment, the method includes loading the gas turbine at up to it's maximum rate, and loading the steam turbine at its maximum rate with excess steam bypassed to the condenser while maintaining the temperature of steam supplied to the steam turbine at a substantially constant temperature from initial steam admission into the steam turbine until all steam generated by the heat recovery steam generator is being admitted to the steam turbine while the gas turbine operates at up to maximum load.

13 Claims, 3 Drawing Sheets

METHODS AND APPARATUS FOR STARTING UP COMBINED CYCLE POWER SYSTEMS

BACKGROUND OF THE INVENTION

This invention relates generally to combined cycle power generation systems and more specifically, to methods and apparatus for fast starting and loading such systems.

As is well known in the art, combined cycle power systems include one or more gas turbines and heat recovery steam generators (HRSG's) and a steam turbine. Traditional combined cycle system startup procedures include low load holds of the gas turbine and restrictions on the gas turbine loading rate to control the rate of increase in steam temperature. These holds and restrictions contribute to air emissions during the startup event, may increase starting and loading time, and may increase fuel consumption during starting and loading.

More specifically, with combined cycle systems during starting and loading, and prior to the gas turbine achieving full load, the gas turbine is put on a hold until the temperature of the steam generated by the HRSG matches the steam turbine high pressure and intermediate pressure bowl metal temperature and/or the HRSG warms at an allowable rate and/or the HRSG is warmed up to the point of being ready for fuel heating. By holding the gas turbine at low load, the gas turbine operates at a low efficiency and with high exhaust emissions.

Such traditional starting procedures have been tolerated at least in part because in the past, startups were infrequent. With day to night power price swings, however, such startups have become more frequent.

BRIEF DESCRIPTION OF THE INVENTION

In one aspect, a method for starting and loading a combined cycle power generation system is provided. The system includes a gas turbine, heat recovery steam generator and a steam turbine. The method includes loading the gas turbine at an increased rate, and maintaining the temperature of high pressure and hot reheat steam supplied to the steam turbine at substantially constant temperature from initial steam admission into the steam turbine until all the steam generated by the gas turbine and HRSG combination is admitted, which facilitates optimizing loading of the steam turbine.

In another aspect, a combined cycle power generation system is provided. The system includes a generator, a gas turbine coupled to the generator, a steam turbine coupled to the generator, a heat recovery steam generator for supplying steam to the steam turbine, at least one attemperator coupled to the heat recovery steam generator, and a fuel source for providing heated fuel to said gas turbine.

In yet another aspect, a method for starting and loading a combined cycle power generation system is provided. The system includes a gas turbine and a steam turbine. The combined cycle system further includes a heat recovery steam generator which supplies steam to the steam turbine, a condenser connected to the steam turbine, and bypass paths from the heat recovery steam generator to the condenser and between the high pressure steam line and cold reheat steam line. The HRSG includes attemperators in intermediate sections and at the terminals of the high pressure superheater and reheater. The method includes loading the gas turbine to a desired load at up to it's fastest rate, maintaining the temperature of steam supplied to the steam turbine high pressure and intermediate pressure sections at substantially constant temperature from initial steam admission until all of the steam generated by the HRSG is being admitted, loading the steam turbine at its fastest rate, modulating flow of steam through the bypass paths so as to control the high pressure and reheat steam pressure and the rate of increase in pressure, and after all steam flow is admitted to the steam turbine, raising the steam temperature at a rate compatible with allowable steam turbine stress and differential expansion to achieve normal steam turbine output and combined cycle efficiency.

DETAILED DESCRIPTION OF THE INVENTION

While the methods and apparatus are herein described in the context of a combined cycle power system used in an electric utility power generation environment, it is contemplated that the methods and apparatus described herein may find utility in other applications. In addition, the principles and teachings set forth herein are applicable to turbines using a variety of combustible fuels such as, but not limited to, natural gas, gasoline, kerosene, diesel fuel, and jet fuel. In addition, such startup can be utilized in connection with both multi-shaft and single-shaft combined cycle systems. The description hereinbelow is therefore set forth only by way of illustration, rather than limitation.

Figure 1:
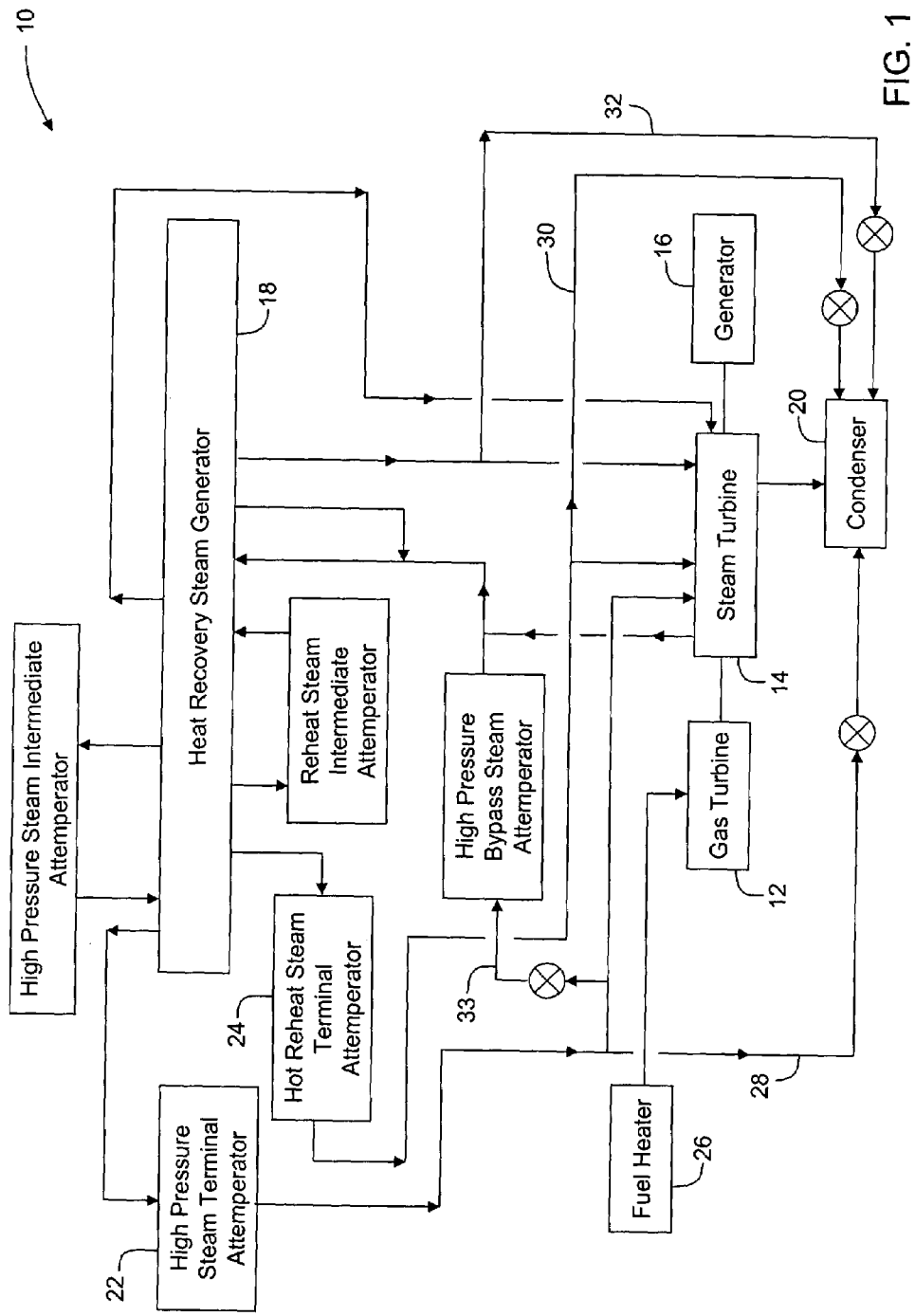
FIG. 1 is a schematic illustration of an exemplary combined cycle power system.

FIG. 1 is a schematic illustration of a combined cycle power system 10 in accordance with one embodiment of the present invention. As is known in the art, system 10 includes a gas turbine 12 and a steam turbine 14 coupled to a generator 16. Steam turbine 14 is connected by multiple conduits to a heat recovery steam generator (HRSG) 18 and its exhaust is connected to a condenser 20.

In the embodiment illustrated in FIG. 1, system 10 includes attemperator 22 at the discharge terminal of the high pressure superheater and attemperator 24 located at the discharge terminal of the reheater in HRSG 18. HRSG 18 may have a once-through or a drum type evaporator which is capable of tolerating daily startup and loading of gas turbine 12 at an optimized rate with normal life span and maintenance. Such HRSGs in drum type configuration are new and generally unknown in the art.

During startup and loading the gas turbine and steam turbine, attemperators 22 and 24 operate to reduce the temperature of high pressure and hot reheat steam generated by HRSG 18 that is supplied to steam turbine 14. Particularly, attemperator 22 facilitates satisfying steam turbine criteria for steam temperature to high pressure bowl metal temperature matching with gas turbine 12 at any load. The temperature of the hot reheat steam for admission to the steam turbine intermediate pressure section is controlled to the steam to metal temperature matching criteria by the reheat steam terminal attemperator 24. Attemperators 22 and 24 are well known in the art and are commercially available, for example, from CCI.

System 10 also includes a fuel gas heater 26 for heating fuel supplied to gas turbine 12. In an example embodiment, such heating can be performed using an auxiliary boiler and intervening heat exchanger between the auxiliary boiler steam outlet and the gas fuel line. Heating the fuel during startup provides the advantage of a faster loading of gas turbine 12 as compared to loading without such fuel heating. More particularly, heating fuel with an auxiliary heat source provides the advantage that during startup gas turbine loading can proceed at an optimized rate. Specifically, heating the fuel utilizing heat from an auxiliary source allows for uninterrupted loading at an optimized rate to facilitate reducing with lowest exhaust emissions to maximizing load.

System 10 further includes bypass paths 28, 30 and 32 from HRSG 18 to condenser 20 and bypass path 33 from the high pressure steam line to the cold reheat steam piping that provide alternate high pressure steam flow paths while the steam turbine admission valves are modulated to load the steam turbine at its fastest allowable rate. Bypass paths 28 and 33 include valves that are modulated to control the pressure of the high pressure steam and the rate of increase of high pressure steam pressure. Bypass path 30 provides an alternate path for the hot reheat steam while the intermediate pressure control valve is modulated during steam turbine loading. Bypass path 30 includes a valve that is modulated to control the reheat steam pressure while the steam turbine intermediate pressure control valve is modulated during steam turbine loading. Steam bypass path 32 provides an alternate path for the low pressure steam while the steam turbine low pressure admission valve is modulated during steam turbine loading. This bypass arrangement allows for 100% or greater steam generation by HRSG 18 with gas turbine 12 at up to maximum load with steam the turbine at any load from no load to a maximum load.

In addition, a steam turbine loading procedure is utilized that holds constant steam temperature from initial steam admission until all of the steam generated by the HRSG with gas turbine 12 at up to maximum load is being admitted and steam turbine loading can be performed at any gas turbine load up to maximum load. This may be accomplished by maintaining the setpoint temperature of the high pressure steam terminal attemperator 22 at either the lowest allowable temperature (for example at approximately 700 F) or if the bowl metal temperature is higher than the minimum, slightly above the measured temperature of the steam turbine high pressure bowl metal temperature when high pressure steam is initially admitted to the steam turbine. Likewise, the hot reheat steam terminal attemperator 24 setpoint is maintained at either the lowest allowable temperature or if the steam turbine intermediate pressure bowl metal temperature is above the minimum when steam admission is initiated, at a temperature at or slightly above the bowl metal temperature. This startup procedure facilitates steam turbine loading while facilitating minimum stress resulting from turbine shell or rotor heating. After all steam flow is being admitted to steam turbine 14, the steam temperature is raised at a rate compatible with allowable steam turbine stress and differential expansion to achieve normal steam turbine output and efficiency. Terminal attemperators 22 and 24 provide control of steam temperature during this steam turbine startup.

For single-shaft systems, where the steam turbine and gas turbine are coupled to a single generator, a steam supply is provided from the first pass of the high pressure superheater to augment cooling steam for the steam turbine last stage buckets during periods when steam bypass to the condenser results in increased condenser pressure and steam turbine cooling flow requirement.

Figure 2A:
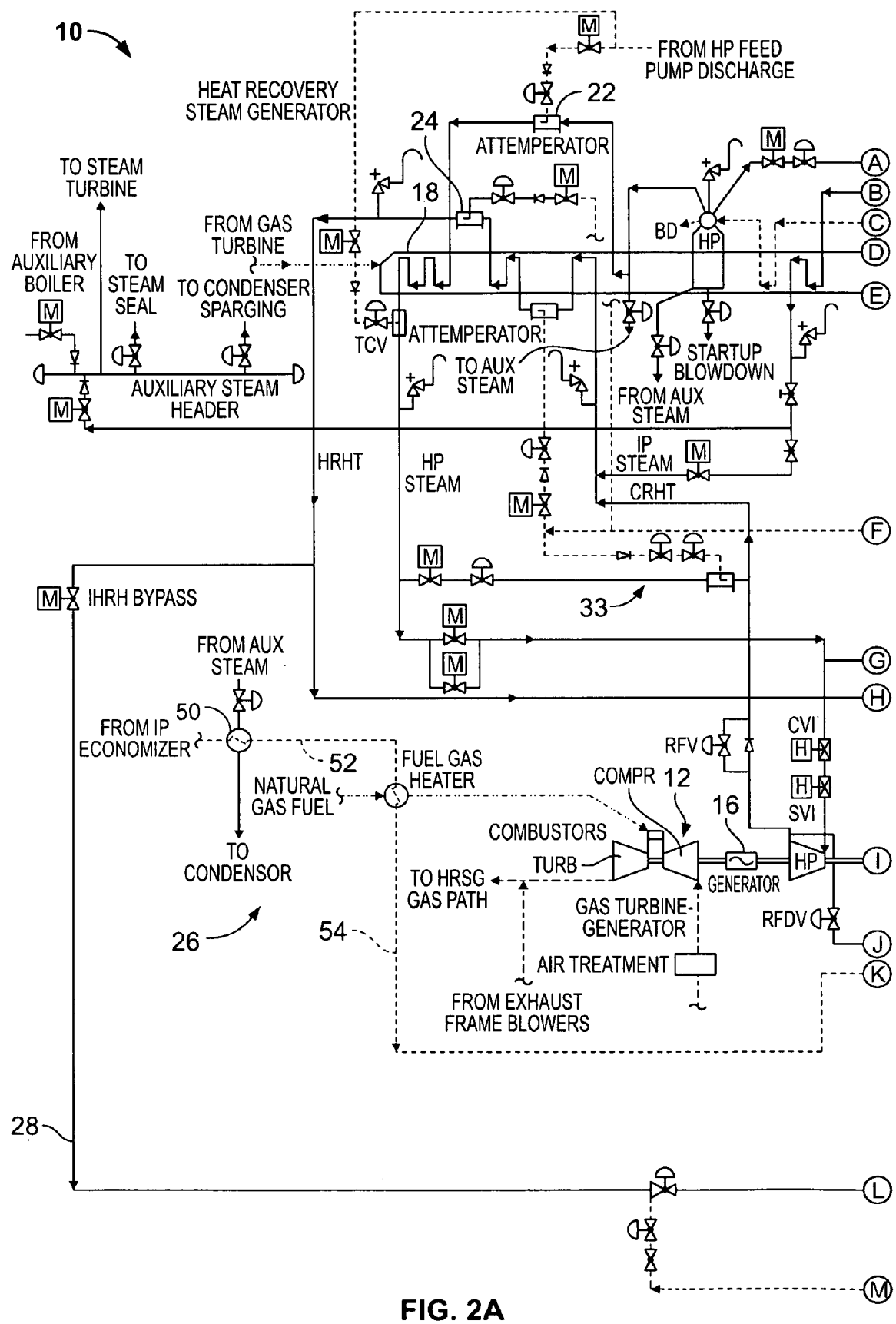
FIGS. 2A and 2B show a more detailed schematic illustration of the combined cycle power system shown in FIG. 1.
Figure 2B:
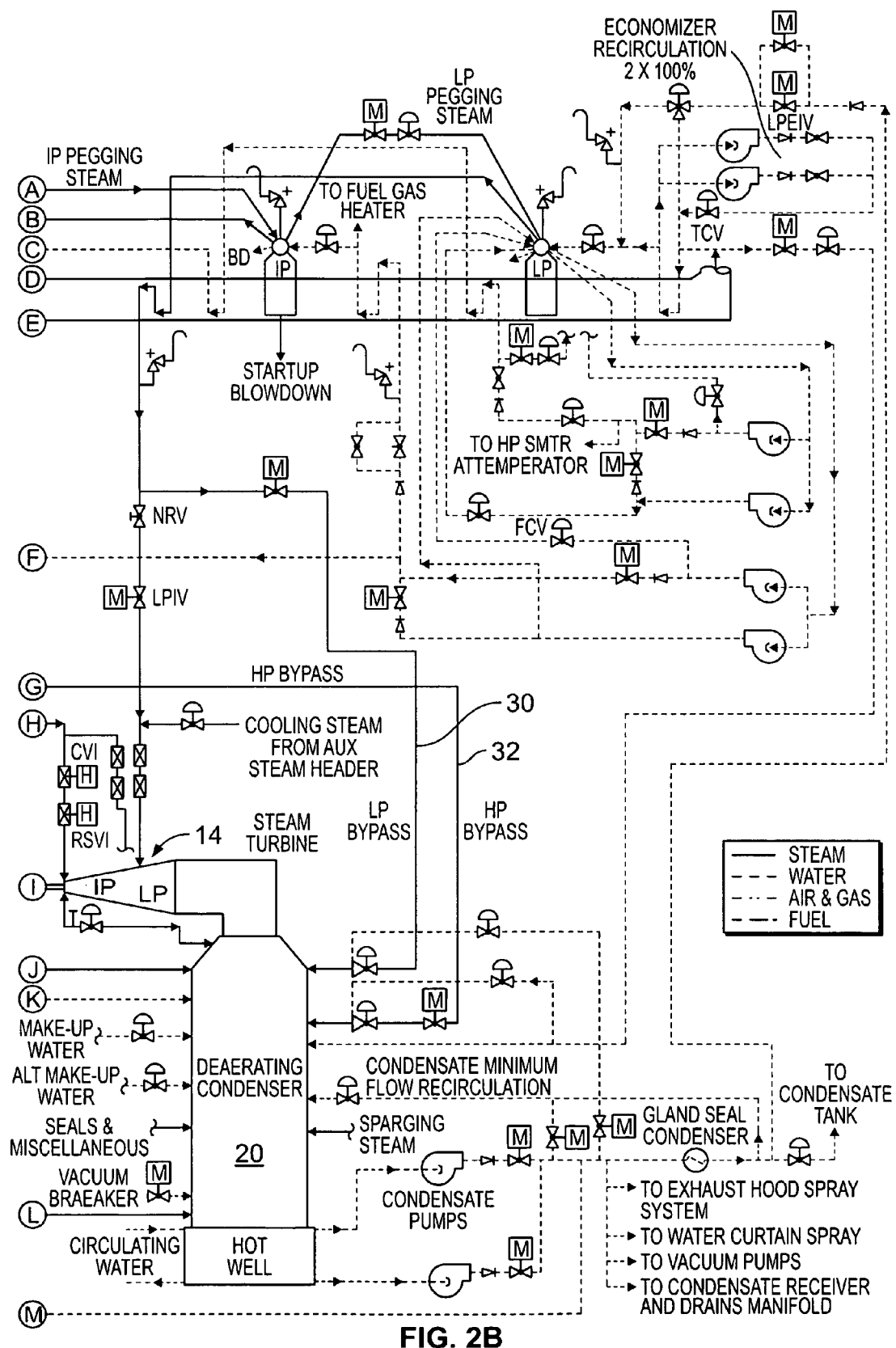

FIGS. 2A and 2B show a more detailed schematic illustration of combined cycle system 10 shown in FIG. 1. The details shown in FIGS. 2A and 2B will be readily understood by those skilled in the art. More particularly, system 10 includes generator 16, gas turbine 12 coupled to generator 16 by a shaft, and steam turbine 14 coupled to generator 16 by a shaft. System 10 also includes heat recovery steam generator 18 for supplying steam to steam turbine 14, and terminal attemperators 22 and 24 coupled to heat recovery steam generator 18. Also, a heated fuel source 26 is provided for supplying heated fuel to gas turbine 12. System 10 also includes condenser 20 connected to steam turbine 14.

As shown in FIGS. 2A and 2B, heated fuel source 26 includes an auxiliary boiler 50 and intervening heat exchanger(s) between auxiliary boiler steam outlet 52 and a gas fuel line 54 to supply heated fuel to gas turbine 12. In another aspect the gas turbine utilizes control changes to facilitate high load operation without heated fuel for operation until the HRSG has warmed up and is capable of heating the gas turbine fuel.

Bypass paths 28, 30 and 32 are provided from said heat recovery steam generator 18 to condenser 20. In another embodiment bypass line 30 is not provided. Bypass path 33 is provided from the main high pressure steam line to the cold reheat steam line. During startup, flow of steam through bypass paths 28, 30, 32 and 33, or 28, 32 and 33 is modulated so as to control facilitating the high pressure, reheat and low pressure steam and provide an alternate path for the steam from the heat recovery steam generator 18 that is not admitted to steam turbine 14 during its loading process. More particularly, during startup, gas turbine 12 is loaded at up to it's fastest rate, and the temperature of steam supplied to steam turbine 14 is maintained at substantially constant temperature from initial steam admission into steam turbine 14 until all flow generated by HRSG 18 is being admitted with gas turbine 12 operating at up to maximum load. After all steam flow is admitted to steam turbine 14, the steam temperature is raised at a rate compatible with allowable steam turbine stress and differential expansion to achieve normal steam turbine output and efficiency.

The above described methods and apparatus facilitate reduced emissions during starting and loading with respect to emissions with known, traditional combined cycle systems. Such methods and apparatus also facilitate reduced starting and loading time and reduced fuel consumption during the starting and loading event with respect to known, traditional combined cycle systems.

Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

While the invention has been described in terms of various specific embodiments, those skilled in the art will recognize that the invention can be practiced with modification within the spirit and scope of the claims.

What is claimed is:

1. A method for starting a combined cycle power generation system including a gas turbine and a steam turbine, said method comprising:
    loading the gas turbine at a rate that is proximately equal to a maximum rate; and
    maintaining a temperature of steam generated from an exhaust flow of the gas turbine and supplied to the steam turbine at a substantially constant temperature from an initial steam admission into the steam turbine until substantially all of the steam generated from the exhaust flow of the gas turbine is admitted into the steam turbine.

2. A method in accordance with claim 1 wherein the combined cycle power generation system includes a heat recovery steam generator that provides steam to the steam turbine, and a condenser coupled to the steam turbine.

3. A method in accordance with claim 2 further comprising cooling the steam supplied to the steam turbine from the heat recovery steam generator.

4. A method in accordance with claim 3 wherein the temperature of steam from the heat recovery steam generator is reduced to satisfy steam turbine criteria for steam temperature to turbine metal temperature matching with gas turbine at any load.

5. A method in accordance with claim 4 wherein the steam temperature of steam from the heat recovery steam generator is reduced using at least one attemperator.

6. A method in accordance with claim 1 further comprising heating fuel supplied to the gas turbine.

7. A method in accordance with claim 6 wherein the fuel is heated using an auxiliary boiler and at least one intervening heat exchanger between an auxiliary boiler steam outlet and a gas fuel line.

8. A method in accordance with claim 1 wherein the combined cycle system further includes a heat recovery steam generator coupled to the steam turbine, a condenser coupled to the steam turbine, and bypass paths from the heat recovery steam generator to the condenser, and wherein the method further comprises controlling a flow of steam through the bypass paths so as to adjust reheat pressure from the heat recovery steam generator to the steam turbine.

9. A method in accordance with claim 1 wherein after substantially all of the steam is admitted into the steam turbine, the steam temperature is raised at a rate compatible with allowable steam turbine stress to achieve normal steam turbine output and efficiency.

10. A method for starting a combined cycle power generation system, the combined cycle power generation system including a gas turbine, a steam turbine, a heat recovery steam generator that generates steam, and receives exhaust heat from said gas turbine and is equipped with attemperators at discharge terminals of a high pressure superheater and a reheater and is connected to the steam turbine and supplies steam to the steam turbine, a condenser connected to the steam turbine, and bypass paths from the heat recovery steam generator to the condenser and from a high pressure steam line to a hot reheat steam piping; said method comprising:

loading the gas turbine up to a rate that is approximately equal to a maximum rate of the gas turbine;

maintaining steam temperature of steam supplied to the steam turbine at a substantially constant temperature from an initial steam admission into the steam turbine until all of the steam generated by the heat recovery steam generator with the gas turbine operating at up to a maximum load is admitted into the steam turbine;

modulating a flow of steam through the bypass paths so as to control the high pressure steam pressure, reheat pressure and low pressure steam pressure from the heat recovery steam generator, and provide alternate paths for the steam while steam turbine admission valves are modulated during loading; and after substantially all the steam is admitted into the steam turbine, raising the steam temperature at a rate compatible with allowable steam turbine stress and differential expansion to achieve normal steam turbine output and efficiency.

11. A method in accordance with claim 10 further comprising cooling the steam supplied to the steam turbine from the heat recovery steam generator.

12. A method in accordance with claim 10 further comprising heating fuel supplied to the gas turbine.

13. A method in accordance with claim 12 wherein the fuel is heated using an auxiliary boiler and at least one intervening heat exchanger between an auxiliary boiler steam outlet and a gas fuel line.

* * * * *

UNITED STATES PATENT AND TRADEMARK OFFICE
CERTIFICATE OF CORRECTION

| | |
|---|---|
| PATENT NO. | : 7,621,133 B2 |
| APPLICATION NO. | : 11/282215 |
| DATED | : November 24, 2009 |
| INVENTOR(S) | : Tomlinson et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 957 days.

Signed and Sealed this

Fourteenth Day of December, 2010

David J. Kappos
*Director of the United States Patent and Trademark Office*